US 9,983,866 B1

(12) United States Patent
Panchanathan et al.

(10) Patent No.: US 9,983,866 B1
(45) Date of Patent: May 29, 2018

(54) UPGRADE COMPATIBILITY CHECKS IN A CLIENT-SERVER ENVIRONMENT

(71) Applicant: EMC IP Holding Company LLC, Hopkinton, MA (US)

(72) Inventors: Balaji Panchanathan, Bangalore (IN); Satchidananda Patra, Bangalore (IN); Pravin AshokKumar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days. days.

(21) Appl. No.: 14/869,461

(22) Filed: Sep. 29, 2015

(51) Int. Cl.
*G06F 9/44* (2018.01)
*G06F 9/445* (2018.01)
*H04L 29/08* (2006.01)

(52) U.S. Cl.
CPC ............... *G06F 8/65* (2013.01); *G06F 8/61* (2013.01); *H04L 67/10* (2013.01)

(58) Field of Classification Search
CPC .................................... G06F 8/61; G06F 8/65
USPC ................... 717/168, 170, 171, 176
See application file for complete search history.

(56) References Cited

U.S. PATENT DOCUMENTS

| 6,980,558 | B2* | 12/2005 | Aramoto | G06F 8/65 370/401 |
| 7,376,951 | B1* | 5/2008 | Yip | G06F 8/71 718/100 |
| 7,934,210 | B1* | 4/2011 | Stampfli | G06F 8/61 709/220 |
| 8,972,968 | B1* | 3/2015 | Vichare | G06F 8/65 717/170 |
| 9,582,261 | B2* | 2/2017 | Singh | G06F 8/65 |
| 2002/0026478 | A1* | 2/2002 | Rodgers | G06F 8/65 709/205 |
| 2003/0014470 | A1* | 1/2003 | Iijima | G06F 8/65 718/106 |
| 2003/0233648 | A1* | 12/2003 | Earl | G06F 8/65 717/176 |
| 2005/0120346 | A1* | 6/2005 | Sprigg | G06F 8/65 717/176 |
| 2008/0301668 | A1* | 12/2008 | Zachmann | G06F 8/67 717/173 |
| 2013/0111456 | A1* | 5/2013 | Bonnell | G06F 9/44536 717/170 |
| 2014/0214515 | A1* | 7/2014 | Quirk | G06Q 30/0225 705/14.26 |

* cited by examiner

*Primary Examiner* — Phillip H Nguyen
(74) *Attorney, Agent, or Firm* — Van Pelt, Yi & James LLP

(57) ABSTRACT

Techniques to automatically detect incompatibility between client software and server software with which the client software is associated are disclosed. In various embodiments, an indication is received that a client software version is associated with a client system comprising a plurality of client systems associated with a server system. A software compatibility data associated with the server system is accessed. The client software version is compared to at least a portion of the software compatibility data. A determination is made, based at least in part on the comparison, as to whether the client software version is compatible with a server software version associated with the server system.

20 Claims, 6 Drawing Sheets

UPGRADE COMPATIBILITY CHECKS IN A CLIENT-SERVER ENVIRONMENT

BACKGROUND OF THE INVENTION

Some services provided via a client-server architecture require a client binary to be installed on the client systems. The client binary may facilitate communication between the client and the server and/or may operate as an agent of the service. For example, a backup server, such as an EMC® Avamar® server or an EMC® Networker® serve, may require a backup agent to be installed on each client system. In another example, a WAN accelerator solution may include a network-based accelerator appliance and client side code installed on WAN clients.

Client systems may be numerous, deployed across a wide area, and primarily under the control of administrative users other than those who administer the server with which the aforementioned client binaries are associated. As a result, under current approaches client side software may be upgraded without the knowledge of server administrators. Such upgrades may result in incompatibility with the current version of server software deployed at the server. Likewise, a server upgrade may result in incompatibility with client software on one or more client systems.

Under current approaches, an administrative user must check manually to determine whether upgraded client software will be compatible with associated servers and conversely that a server upgrade will be compatible with all clients. The current approach requires that the administrator know to perform such a check with respect to all of the clients and/or servers with which a system that is to be upgraded is associated, as well as how to perform such checks and obtain the compatibility information to be used to make such determinations.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to check automatically whether an upgraded client side software is compatible with a current server software version, and to determine automatically whether all client systems have client software that is compatible with a contemplated server upgrade. In various embodiments, a client side binary may include software code configured to detect, e.g., on client system and/or client application startup, that a client side software has been upgraded. The server may be informed of the upgrade and may consult a compatibility matrix or other data structure or source to determine whether the upgraded client side software is compatible with the current server version. If not, responsive action may be taken. In some embodiments, a server upgrade process may include an automated check to determine whether associated client side software will remain compatible after the server upgrade. If not, responsive action may be taken.

Figure 1:
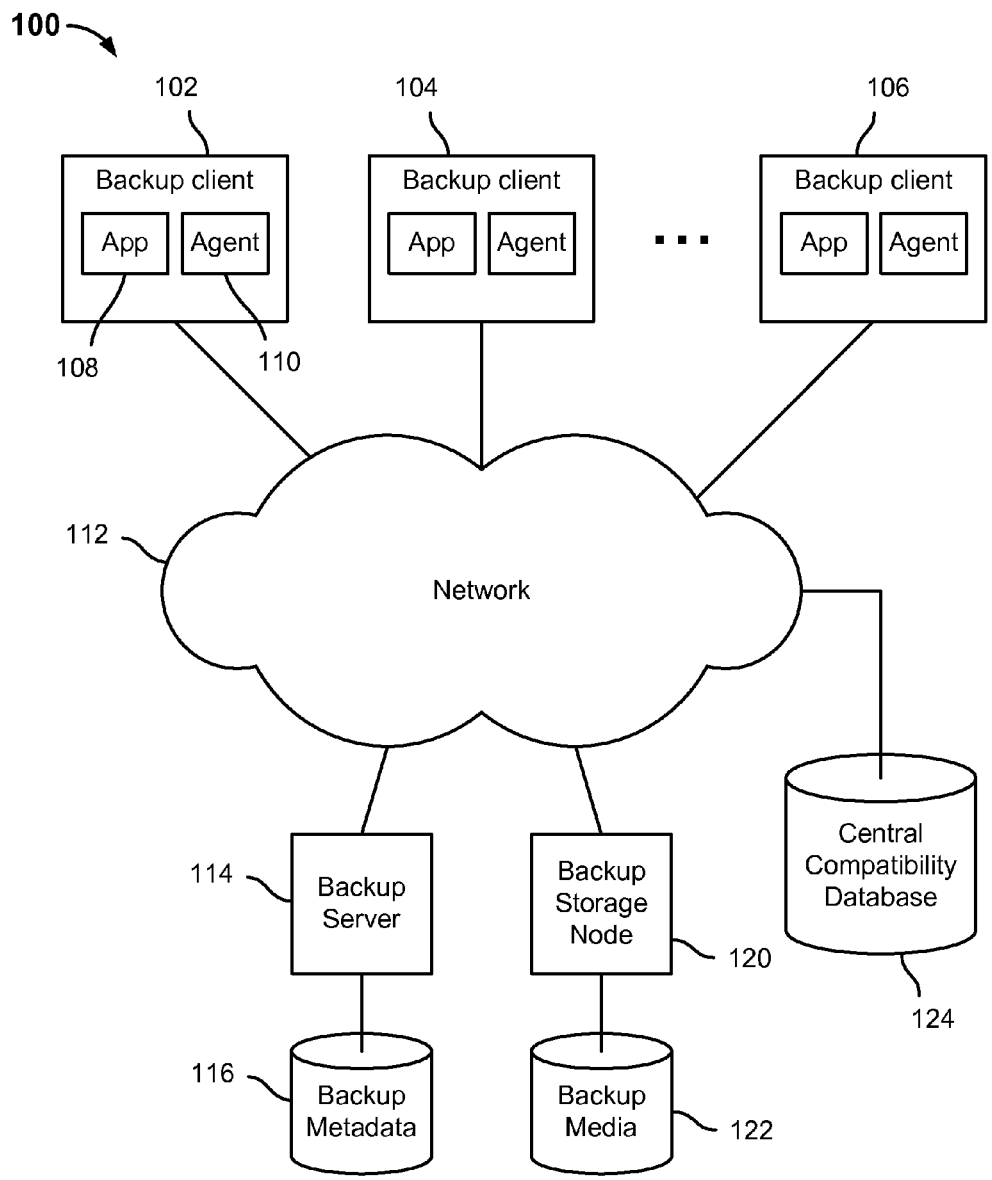
FIG. 1 is a block diagram illustrating an embodiment of a system to perform compatibility checks in a client-server environment.

FIG. 1 is a block diagram illustrating an embodiment of a system to perform compatibility checks in a client-server environment. In the example shown, client-server environment 100 includes a plurality of client systems, in this example backup clients (e.g., file servers, etc.) represented in FIG. 1 by backup clients 102, 104, and 106. Each backup client system includes an application, such as application 108 of client system 102. The backup of application data associated with application 108 is coordinated and/or performed at least in part by backup agent 110. Examples of backup agent 110 include, without limitation, backup client software and/or a backup binary, such as an "avtar" binary associated with a remote EMC® Avamar® backup server.

Referring further to FIG. 1, each of the client systems (102, 104, 106) is connected via a network 112 to a backup server 114 configured to use backup metadata 116 to back up application data on associated client systems. In various embodiments, backup server 114 cooperates with backup agents, such as backup agent 110, on the respective client systems to back up application data. Application data may be backed up at least in part by storing a backup copy of application data on a backup storage node 120, which in the example shown is configured to store backup data on a backup media 122, e.g., a set of one or more hard disk drives, optical drives, removable media such as tape media, etc.

In various embodiments, server upgrades and/or client software upgrades may be detected, and compatibility checks may be performed automatically to determine whether upgrade client software is compatible with a current version of associated server, and/or conversely that installed client software is (or would be) compatible with an actual or contemplated server upgrade. In the example shown in FIG. 1, for example, a central compatibility database 124 is available via network 112 to backup server 114 and in various embodiments to other instances of backup server 114 associated with other client-server environments, such as environment 100 of FIG. 1.

In various embodiments, central compatibility database 124 may include, for each of a plurality of versions (configurations, etc.) of each of one or more type of server, data reflecting which versions of which client software is/are compatible with that server version (configuration, etc.). In various embodiments, central compatibility database 124 may include, for each of a plurality of versions (configurations, etc.) of each of one or more client side applications, binaries, and/or other code, data reflecting which versions of which corresponding server is/are compatible with that client software.

In various embodiments, a server such as backup server 114 in the example shown may be configured to populate and maintain a local compatibility matrix. For example, backup server 114 may be configured to query central compatibility database 124 to populate a local compatibility matrix in which the client software version(s) compatible with the current server/version are listed. In some embodiments, if backup server 114 encounters client software not listed in the compatibility matrix, backup server 114 may query central compatibility database 124 to determine whether the client software is compatible with the current server version (configuration, etc.) of backup server 114. In some embodiments, if client software is determined by backup server 114 to not be compatible with the current server version (configuration, etc.) of backup server 114, backup server 114 may query central compatibility database 124 to determine a server version (configuration, etc.) that is compatible with the newly-encountered client software.

Figure 2:
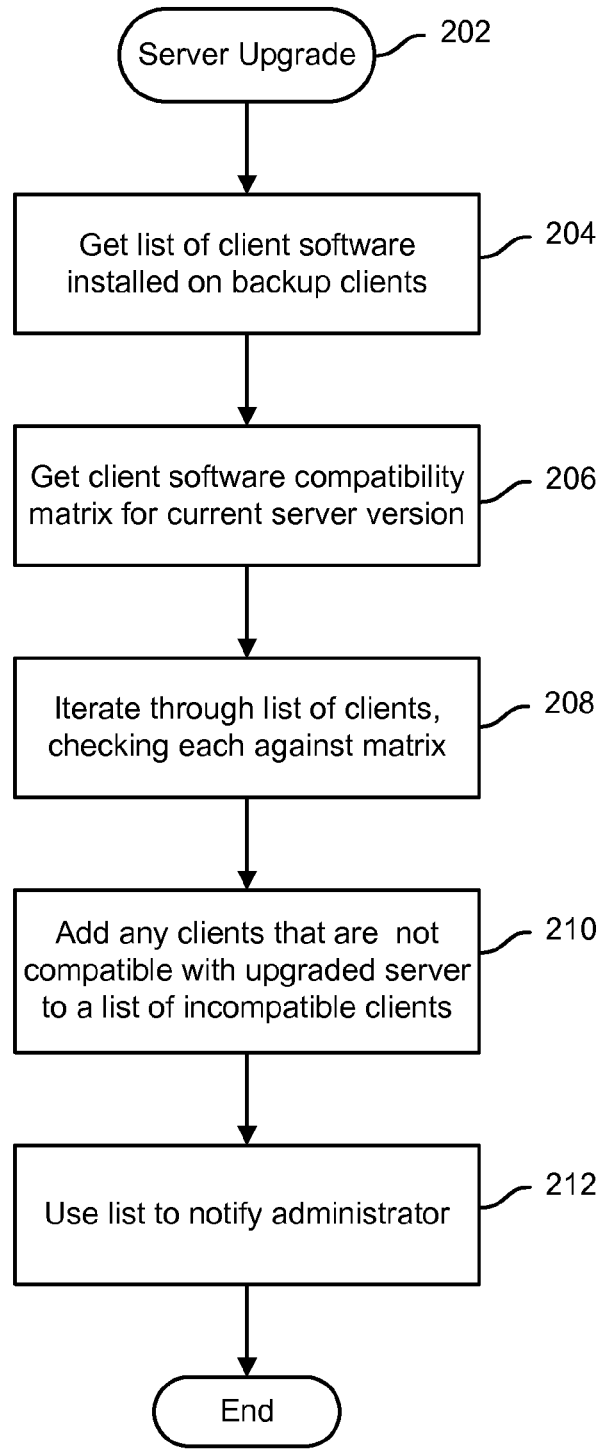
FIG. 2 is a flow chart illustrating an embodiment of a process to perform a compatibility check in the context of a server upgrade.

FIG. 2 is a flow chart illustrating an embodiment of a process to perform a compatibility check in the context of a server upgrade. In various embodiments, the process of FIG. 2 may be performed by a server that is associated with one or more clients, such as backup server 114 of FIG. 1. In the example shown, in the event of a server upgrade (202), e.g. to a more recent version of server software, a list of client software installed on client systems associated with the server (in the example shown, backup clients associated with a corresponding backup server that is being upgraded) is obtained and/or accessed (204). For example, a backup server, such as backup server 114 of FIG. 1, may maintain a list of the client software and version currently installed on each client system (i.e., backup client) the backup server is configured to back up, such as client systems 102, 104, and 106 in the example shown in FIG. 1. A compatibility matrix for the server software and/or version to which the server is being upgraded is obtained (206), e.g., from a central repository such as central compatibility database 124 of FIG. 1. The list of currently installed client software (204) is iterated through to determine for each client whether that client is/remains compatible with the server upgrade (208).

Any clients that are not compatible with the server upgrade are added to a list of incompatible clients (210). The list of incompatible clients is used to notify an administrator (212) and/or take other responsive action.

Figure 3:
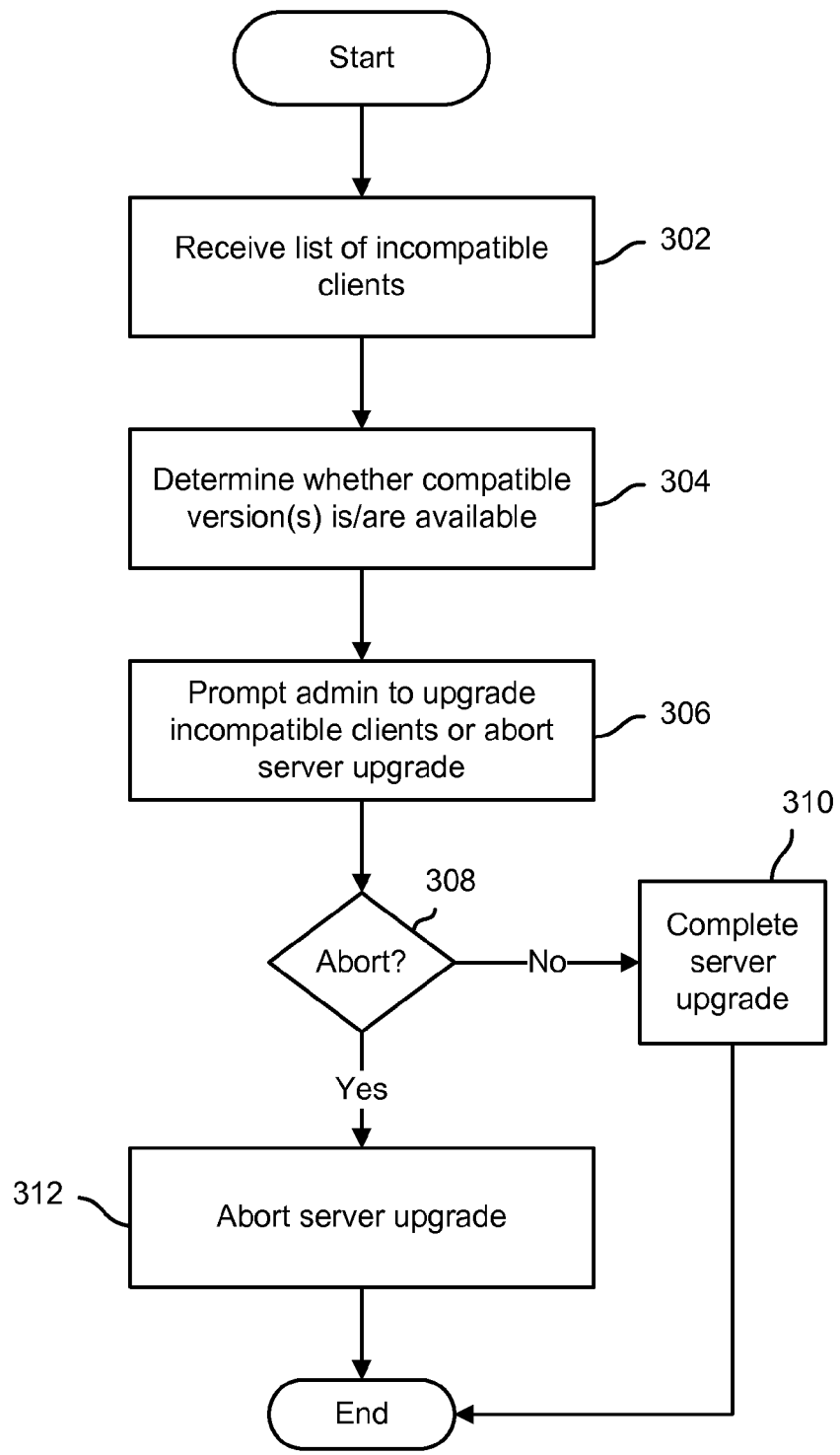
FIG. 3 is a flow chart illustrating an embodiment of a process to handle clients determined not to be compatible with a server upgrade.

FIG. 3 is a flow chart illustrating an embodiment of a process to handle clients determined not to be compatible with a server upgrade. In various embodiments, the process of FIG. 2 may be performed by a server that is associated with one or more clients, such as backup server 114 of FIG. 1. In the example shown, a list of incompatible clients is received (302), e.g., as an output generated by an iteration of the process of FIG. 2 (e.g., step 210). For each incompatible client on the list, it is determined whether a version of that client software that would be compatible with the server as upgraded is available (304). In some embodiments, the server may query a central compatibility database, such as database 124 of FIG. 1, to determine client software and/or versions that are compatible with the server upgrade. An administrative user is prompted to upgrade those clients for which compatible client software has been determined to be available, or to abort (or roll back) the server upgrade (306). For example, a dialog box or other user interface may be displayed. The user interface may include a user selectable option to "abort" the server upgrade. For example, if compatible client software has not been determined for one or more clients, the administrative user may be prompted to indicate whether the server upgrade should be aborted. Or, a list of client systems that require client software to be upgraded to be compatible with the server upgrade may be displayed, and the administrative user may be prompted to upgrade the affected client systems an indicate that the server upgrade should "continue" or instead indicates that the server upgrade should be aborted.

If the administrative user provides an input that indicates the server upgrade should not be aborted (308), the server upgrade continues to completion (310). If the administrative user indicates the server upgrade should be aborted (308), the server upgrade is aborted (312) and the previous server version is maintained or restored. In some cases, for example, an administrative user may abort the server upgrade to allow time for client systems that would not have been compatible with the server upgrade to be upgraded, e.g., by installing a newer version of client software.

Figure 4:
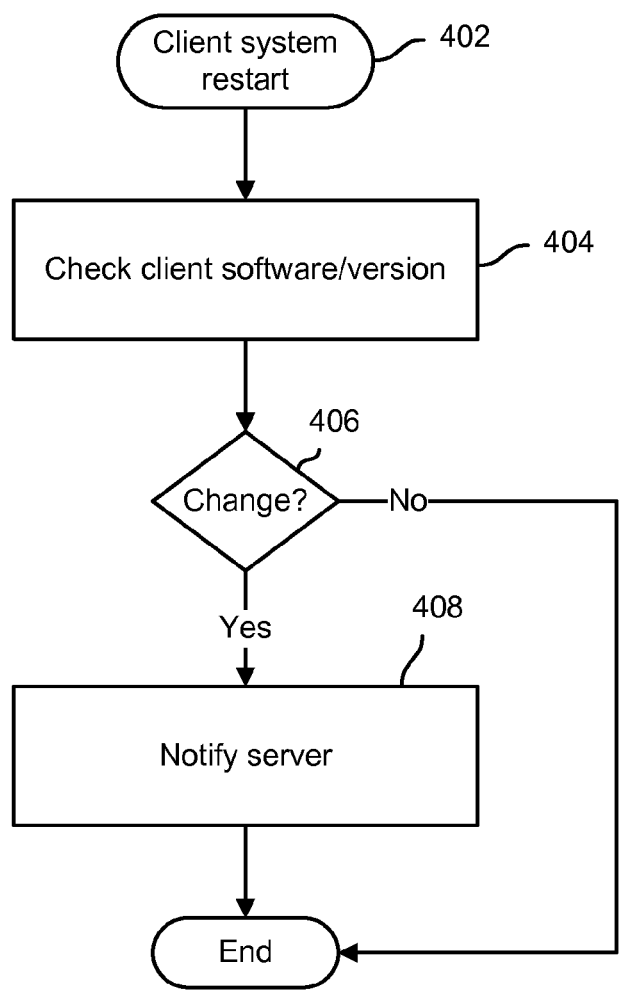
FIG. 4 is a flow chart illustrating an embodiment of a process to detect client side software upgrades.

FIG. 4 is a flow chart illustrating an embodiment of a process to detect client side software upgrades. In various embodiments, client side code, for example a backup agent, such as backup agent 110 of FIG. 1, or other client binary may be configured to perform the process of FIG. 4. On client system restart and/or client application launch (402), a client software and version may be checked and compared to a corresponding value stored previously (404).

In some embodiments, for each application the client side agent (e.g., avtar binary in the case of a client of an EMC® Avamar® server) knows how/where to find the version of the associated client application. For example, for Linux the avtar or other client may read some files, and for windows it may read some registries. In various embodiments, for each plugin the code is separate depending on the application/plugin.

If the current value does not match the previously-stored value, indicating the client software/version has changed since the last check (406), the associated server is notified of the change (408). Otherwise, if the client software/version has not changed (406), then no notification is sent.

Figure 5:
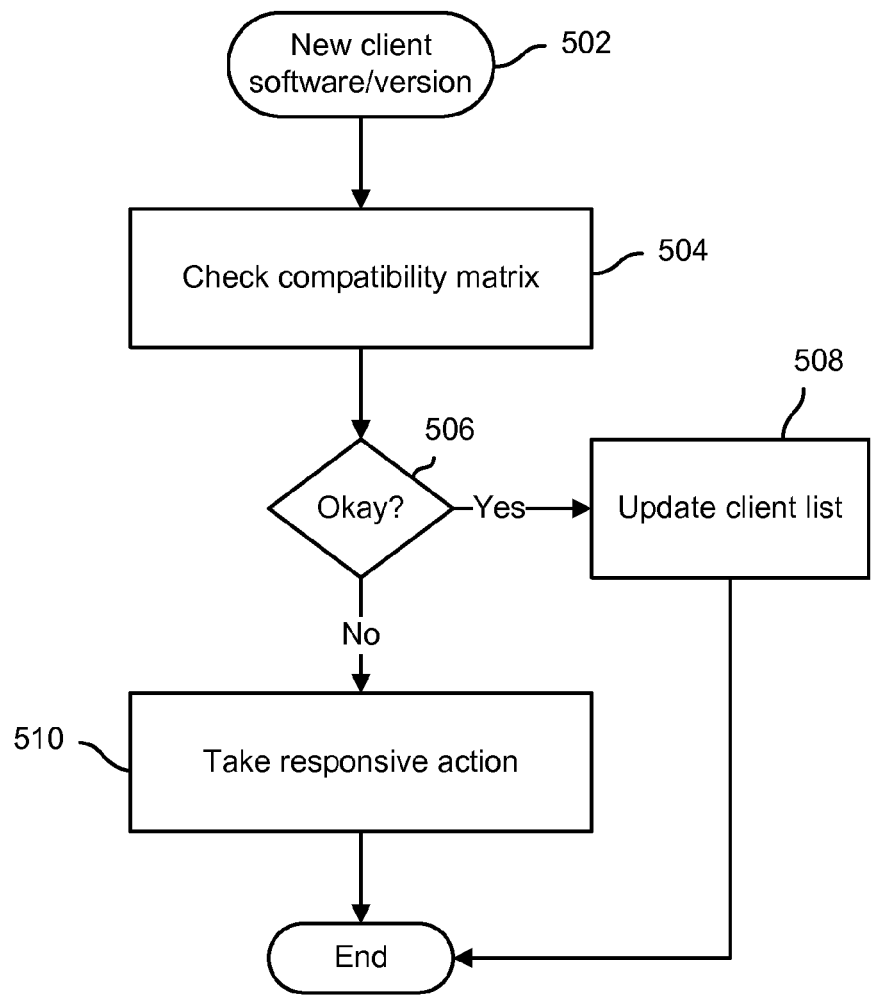
FIG. 5 is a flow chart illustrating an embodiment of a server side process to ensure compatibility of client side software upgrades.

FIG. 5 is a flow chart illustrating an embodiment of a server side process to ensure compatibility of client side software upgrades. In various embodiments, the process of FIG. 5 may be performed by a server, such as backup server 114 of FIG. 1, e.g., in response to receiving an indication that a new client software/version has been detected at a client associated with the server. In the example shown, an indication that a new client software/version has been detected is received (502). A locally-stored compatibility matrix (or other data structure) is checked to determine whether the new client software/version is compatible with the current version of the server (504). If the new client software/version is compatible (506), a locally-stored list of client software is updated to associate the detected client software/version with the client system on which it has been detected (508). If the new client software/version is determined not to be compatible (506), responsive action is taken (510). Examples of such responsive action may include, without limitation, sending an alert or other notification, prompting an administrative user to uninstall the detected client software/version, prompting an administrative user to upgrade the server to a server software/version with which the detected client software/version is compatible, etc.

Figure 6:
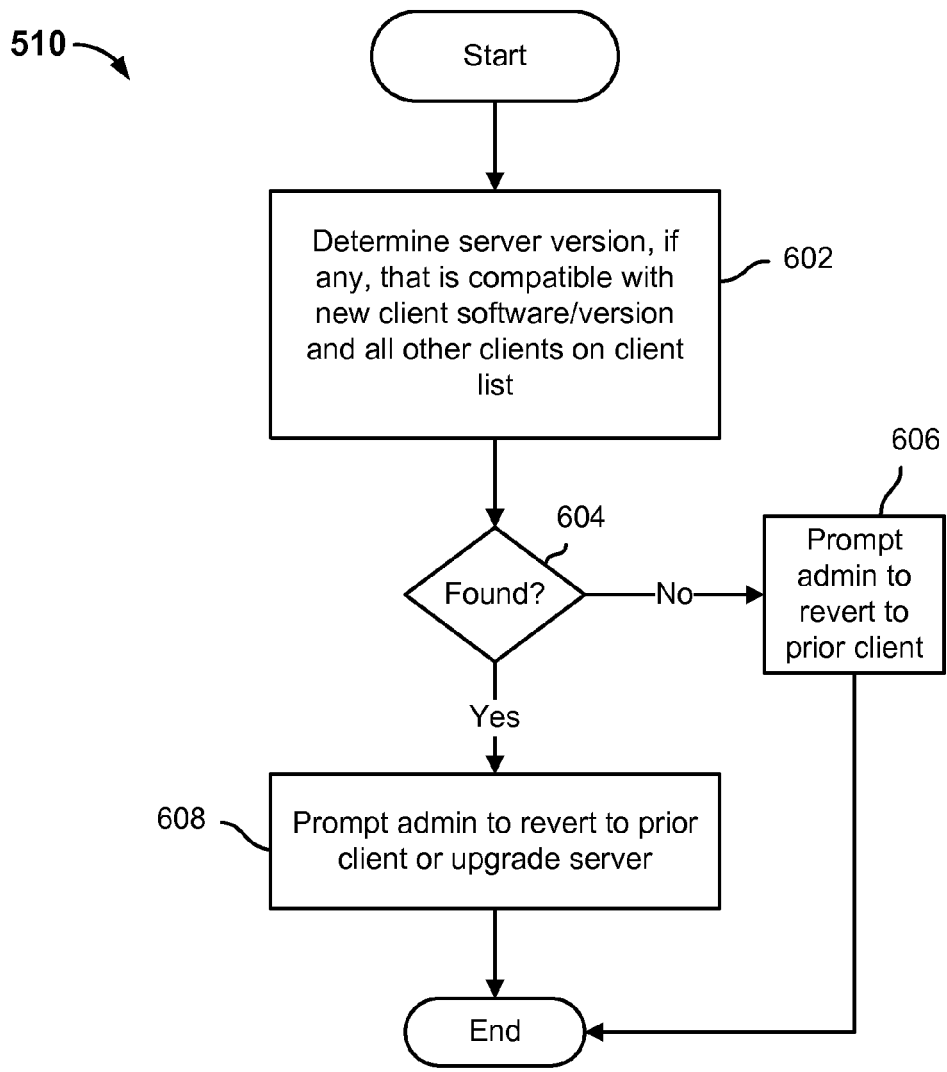
FIG. 6 is a flow chart illustrating an embodiment of a process to respond to an indication that a detected client upgrade is not compatible with current server side software.

FIG. 6 is a flow chart illustrating an embodiment of a process to respond to an indication that a detected client upgrade is not compatible with current server side software. In various embodiments, step 510 of the process of FIG. 5 may include the process of FIG. 6. In the example shown, a server version (if any) that is compatible with a detected new client software/version and with all other currently installed clients is determined (602). For example, a central repository, such as central compatibility database 124 of FIG. 1, may be queried. If no server software/version that is compatible with the newly-detected client software/version is found (604), an administrative user is notified that no compatible server version was found and the administrative user is prompted to revert the client system to a prior version of the client software (and/or to another client software/version that is compatible) (606). If a compatible server software/version is found, an administrative user is notified of the availability of the compatible server software/version and prompted to either revert the client or upgrade the server to the server software/version that is compatible with the newly-detected client software/version (608).

In various embodiments application of techniques disclosed herein have been described with reference to an EMC® Avamar® server and its client(s), but the techniques may be applied to many other scenarios where there is a central server and client binaries need to be installed on the client machines, and clients communicates with the central server for various purposes such as backup, wan accelerators deployed on clients, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving, from a client system, an indication that a client software has been upgraded on the client system, wherein the client system sends the indication in response to determining, upon system restart or client software launch, that a current value associated with the client software does not match a previously-stored value associated with the client software, and wherein the client system comprises a plurality of client systems associated with a server system;
in response to receiving the indication that the client software has been upgraded,
using a processor to access a software compatibility data associated with the server system in connection with an upgrade of the client software on the client system;
using the processor to compare the client software version to at least a portion of the software compatibility data;
using the processor to determine based at least in part on the comparison whether the client software version is compatible with a server software version associated with the server system;
in response to determining that the client software version is determined to not be compatible with the server software version associated with the server system, determining whether a compatible version of the server software is available;
in response to determining that the compatible version of the server software is available, providing an indication of the compatible version of the server software; and
in response to determining that the compatible version of the server software is not available, aborting the upgrade of the client software on the client system.

2. The method of claim 1, wherein receiving the indication that the client software version is associated with the client system comprises reading the client software version information from a list of client software registered to the server system.

3. The method of claim 1, wherein receiving the indication that the client software version is associated with the client system comprises using a processor to detect at the client system that the client software version has been installed.

4. The method of claim 1, wherein the server software version comprises a software version to which the server system has been upgraded.

5. The method of claim 1, wherein the server software version comprises a software version to which the server system is being upgraded.

6. The method of claim 1, further comprising taking responsive action based at least in part on a determination that the client software version is not compatible with the server software version.

7. The method of claim 6, wherein the responsive action includes prompting a user to uninstall the client software version from the client system.

8. The method of claim 6, wherein the responsive action includes prompting a user to abort an upgrade of the server system to the server software version.

9. The method of claim 1, wherein using said processor to access said software compatibility data associated with the server system comprises reading data from a data structure on the server system.

10. The method of claim 1, wherein using said processor to access said software compatibility data associated with the server system comprises accessing a central compatibility database.

11. A system, comprising:
a communication interface; and
a processor coupled to the communication interface and configured to:
receiving, from a client system, an indication that a client software has been upgraded on the client system wherein the client system sends the indication in response to determining upon system restart or client software launch that a current value associated with the client software does not match a previously-stored value associated with the client software, and wherein the client system comprises a plurality of client systems associated with a server system;

in response to receiving the indication that the client software has been upgraded, access a software compatibility data associated with the server system;

compare the client software version to at least a portion of the software compatibility data;

determine based at least in part on the comparison whether the client software version is compatible with a server software version associated with the server system;

in response to determining that the client software version is determined to not be compatible with the server software version associated with the server system, determine whether a compatible version of the server software is available;

in response to determining that the compatible version of the server software is available, provide an indication of the compatible version of the server software; and in response to determining that the compatible version of the server software is not available, aborting the upgrade of the client software on the client system.

12. The system of claim 11, wherein the client software version is read from a list of client software registered to the server system.

13. The system of claim 11, wherein the client software version is detected at the client system to be installed at the client system.

14. The system of claim 11, wherein the server software version comprises a software version to which the server system has been upgraded.

15. The system of claim 11, wherein the server software version comprises a software version to which the server system is being upgraded.

16. The system of claim 11, wherein the process is further configured to take responsive action based at least in part on a determination that the client software version is not compatible with the server software version.

17. The system of claim 16, wherein the responsive action includes prompting a user to uninstall the client software version from the client system.

18. The system of claim 16, wherein the responsive action includes prompting a user to abort an upgrade of the server system to the server software version.

19. The system of claim 11, wherein the processor is configured to access said software compatibility data associated with the server system by accessing a central compatibility database.

20. A computer program product embodied in a non-transitory computer readable storage medium and comprising computer instructions for:

receiving, from a client system, an indication that a client software has been upgraded on the client system, wherein the client system sends the indication in response to determining, upon system restart or client software launch, that a current value associated with the client software does not match a previously-stored value associated with the client software, and wherein the client system comprises a plurality of client systems associated with a server system;

in response to receiving the indication that the client software has been upgraded, using a processor to access a software compatibility data associated with the server system;

using the processor to compare the client software version to at least a portion of the software compatibility data;

using the processor to determine based at least in part on the comparison whether the client software version is compatible with a server software version associated with the server system;

in response to determining that the client software version is determined to not be compatible with the server software version associated with the server system, determining whether a compatible version of the server software is available;

in response to determining that the compatible version of the server software is available, providing an indication of the compatible version of the server software; and in response to determining that the compatible version of the server software is not available, aborting the upgrade of the client software on the client system.

* * * * *